Aug. 24, 1943.     F. G. PURINTON     2,327,556
FLUTED SHANK FASTENER
Filed Sept. 9, 1942
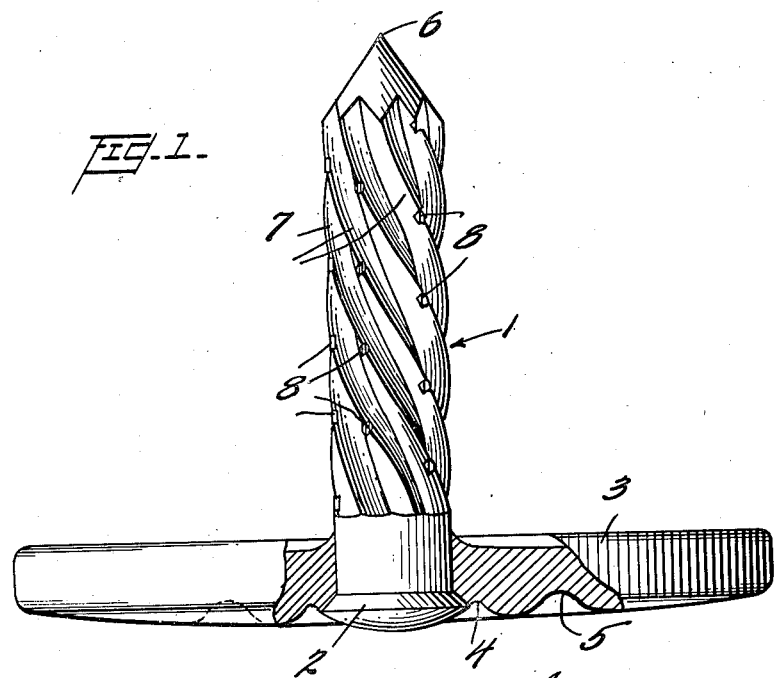
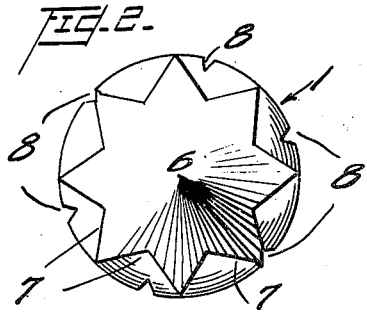 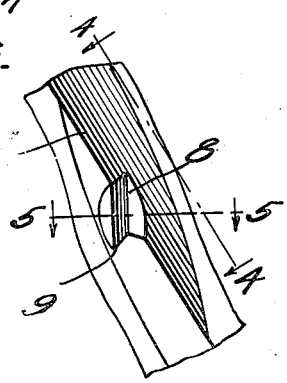
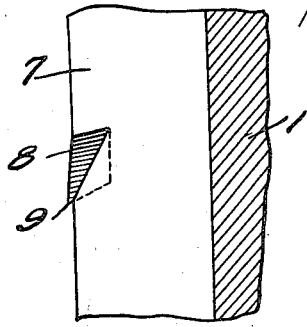 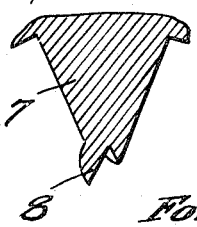 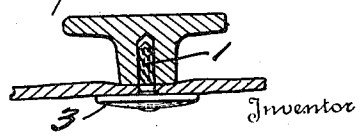
Inventor
Forrest G. Purinton,
By Parker Cook
Attorney Patented Aug. 24, 1943

2,327,556

UNITED STATES PATENT OFFICE 2,327,556

FLUTED SHANK FASTENER

Forrest G. Purinton, Waterbury, Conn., assignor to The Patent Button Company, Waterbury, Conn., a corporation of Connecticut Application September 9, 1942, Serial No. 457,773

5 Claims. (Cl. 24—90)

My invention relates to new and useful improvements in fasteners, and more particularly to a fluted shank fastener for securing buttons to garments.

The present invention is a continuation in part of an application filed by me on June 25, 1941, and bearing Serial No. 399,693 for Fluted shank fasteners, and is also somewhat similar to a fluted shank fastener shown in an application filed by me on April 23, 1941, bearing Serial No. 389,963.

The present invention relates particularly to the manner in which the barbs are positioned and formed on the helical flutes so that when the fastener has once been driven into the opening in the receptive button, it will take a far greater pulling force to dislodge the fastener than is ever exerted on an attached garment button.

Still another object of the invention is to provide a tack fastener especially adapted for use with buttons formed of "Bakelite" or other hard plastics, in the hub of which button there is formed a receptive smooth bore several thousandths less in diameter than the diameter of the fastener. The fastener in turn is provided with barbs formed on the helical ridges thereof, which barbs extend on the under surface of the respective ridges or flutes, so that when the tack fastener is driven into the smooth bore, due to the pitch of the helix the fastener will slightly rotate to cut its own groove into the bore, and the barbs will not materially affect the entering action.

However, to remove the fastener it would be necessary to provide a pulling strain of several hundred pounds on the button, which would not happen in ordinary use as the fastener will slightly rotate in the opposite direction from which it entered and the barbs will bite into the grooves of the bore to thus provide an excellent fastening means for the button.

Still another object of the invention is to provide a fluted shank fastener wherein each flute is provided with a plurality of barbs the points of which extend towards the head of the fastener, and which barbs are formed by plowing the metal that forms the barbs from the ridges of the helices over to the under sides or faces of their respective helices or flutes.

In other words, in forming the barbs no metal is removed, but the metal forming the resultant barbs is plowed or forced in the desired direction.

Thus, when the tack or fastener is driven into its receptive bore, the barbs, being on the under surface of the flutes, do not offer any material obstruction to the entrance of the fastener but, on a violent pulling action the upper sides of the grooves in the plastic button in which the flutes of the tack rest are forced against the barbs on the under sides of these flutes, which barbs then cut into the plastic walls, strongly resisting the turning of the tack in the button during withdrawal and thus making for a very efficient fastener.

Still another object of the invention is to provide a fastener having a small radius dome in the center of its head to thus provide a minimum area of contact between the fastener head and the anvil of the attaching machine during the button attaching operation. Thus the fastener can freely partially rotate when the button is forced down on the cloth and the fastener, which fastener, of course, pierces the cloth and cuts its way into its respective bore in the button.

With these and other objects in view, the invention consists in certain new and novel arrangements and combinations of parts as will be hereinafter more fully described and pointed out in the claims.

Referring now to the drawing showing a preferred embodiment,

Fig. 1 is an enlarged side elevation of my improved tack fastener, part of the head being broken away for clearness of illustration;

Fig. 2 is an enlarged top plan view of the shank of the fastener;

Fig. 3 is a fragmentary detail showing on an enlarged scale one barb as having been plowed to the under side of its flute;

Fig. 4 is a sectional view taken on line 4—4 of Fig. 3;

Fig. 5 is a sectional view on line 5—5 of Fig. 3; and

Fig. 6 shows a button with the fastener having been driven therein.

Referring now more particularly to the drawing, and for the moment to Fig. 1, there is shown the fastener on a greatly enlarged scale, consisting of the metal shank 1 which is headed as at 2. A disk 3, preferably of steel, is then swedged under the head, as may be clearly seen in Fig. 1. It will be seen that the headed portion 2 of the shank forms a small radius dome, the radius being purposely less than that of the contour of the head itself in order to provide a minimum area of contact between the fastener head and the anvil of the attaching machine, so that during the attaching operation the fastener can spin freely when the "Bakelite" button is forced down on it.

The groove 4 in the metal disk bounding the center dome is for the purpose of hiding the joint between the two pieces of metal. The outer groove 5 is for the sake of appearance, and may be dispensed with if desired.

The shank of the fastener is pointed as at 6, while the shank is also fluted to provide a series of helical ridges 7 and in the present instance I have shown eight of these ridges or flutes. It will be understood at the outset that the number of flutes and their barbs (to be later mentioned) might be increased to increase the holding power of the fastener. The limit, of course, would be passed if the fastener broached its way into the button instead of partially turning when inserted under pressure.

It also might be mentioned here that I have found that the outside diameter of the flutes should be approximately .064" (sixty-four thousandths of an inch) while the root diameter should be .044" (forty-four thousandths of an inch) making a depth of flute on each side of .010" (ten thousandths of an inch.) The average diameter of the pin which forms the bore in the receptive button (not shown) is .054" (fifty-four thousandths of an inch) so that the flutes cut grooves on the inside of the bore only .005" (five thousandths of an inch) deep, so that the depth of the notches or nicks to form the barbs should be .0035" (thirty-five ten-thousandths of an inch) or about one-third the depth of the flutes.

I have found a fastener having flutes and barbs as above mentioned provides the highest holding power obtained without danger of breaking a button in forcing the tack therein.

If a smaller hole bore is used in the button so the flutes would cut deeper grooves in attaching, the hub of the button will break. If the hole is larger, then with using the same tack it will broach its way into the button instead of turning, and the holding power will be lost.

I have also found that the pitch of the helix is preferably about 30° (thirty degrees), although this may be varied if desired in the same way that the number of flutes may be increased.

Referring now to the gist of the invention—that is, the manner of providing the barbs 8, it will be understood that the points 9 extend towards the tack or fastener head.

These barbs can be formed on the helical ridges by forcing the shank of the fastener into a cylindrical shaped cutting tool (not shown) that will have radially extending nicking tools or plows and I have found by actual experiment that it is preferable to use six of these radially extending tools to thus cut six rows of barbs along the shank of the fastener. In Fig. 1 only three rows may be seen, but the six rows are clearly illustrated in Fig. 2.

As also may be seen in Fig. 1, after the shank is passed into the cutting tool the rows of barbs are in vertical alignment, each plow or nicking tool forming a barb wherever it crosses the edge of its helical ridge. The plows or tools (not shown) are slightly bevelled and stoned to thus plow the metal that forms the barbs in the desired direction—that is, to the under side of the flutes, the tools cutting a notch to a depth of about one-third the depth of the flute when plowing through the helical ridge.

It will be understood as heretofore mentioned that the number of helical flutes might be increased, which would result in an increase of the number of barbs.

It is also true that a cutting tool with more radial knives than six might be used for forming the barbs on the flutes. On the other hand, the flutes might be decreased, and the nicking tools either increased or decreased; but I have found in actual practice that a shank with eight flutes and six rows of barbs gives the greatest holding power without having a tendency to broach its way into the bore of the button.

Although in actual practice in forming these barbs a barb forming tool which travels in a straight line parallel with the axis of the tack has been used, it is understood that a barb forming tool following a path in a helix opposite to the helix of the flutes might also be used; thus, if the flutes on the tack are left-handed the helix of the barb forming tool will be right-handed.

It will be understood that the barbs offer little or no resistance to the insertion of the tack in the bore of its button, as there are no barbs on the upper surface of the respective flutes, which upper surfaces take all the pressure in attaching. However, on a withdrawing action, the fastener will tend to slightly rotate in the opposite direction from which it entered, and in this way the barbs on the under sides of the flute will be forced against the upper walls of the grooves in which they rest to thus resist the turning and withdrawing action of the fastener.

I have found after several thousand comprehensive tests that a fastener formed with a plurality of barbs thereon extending over to the under side of the respective flutes as above outlined, when driven into a smooth bore of a plastic button having a bore of slightly less diameter than the diameter of the tack, resisted an average pull of slightly over two hundred (200) pounds; that the tack rotated in attaching one hundred eighty (180) degrees; while the average degree of rotation in pulling out (to destruction) was ten (10) degrees. This is in comparison with a fluted tack without the barbs whose average resisting strength was one hundred seventy-five (175) pounds and whose rotation in attaching was one hundred eighty (180) degrees, and whose average degree of rotation in pulling out was twenty-eight (28) degrees.

Thus the average gain was slightly over twenty-five (25) pounds, and it is thought that an increase of the helices and the increase of the number of barbs plowed to the under faces of the flutes might add still more strength to the resisting power of the fastener.

As heretofore mentioned, the limit of the number of helices would be reached just before the button would broach itself into the bore, rather than rotate and cut its own grooves.

It might also be mentioned here that the standard required in tack buttons is for the tack to resist a pulling strain of about one hundred eighty (180) pounds, so that an ordinary fluted tack if driven into the button would not withstand the necessary pull to meet the requirements, whereas with the fastener as above formed, it will more than meet the desired standard.

It will be understood that wherein it is mentioned that the tack or fastener is driven into the bore of the button, it also means that the button is forced down on the tack as in reality when tack buttons are fastened to garments, the tack is positioned on an anvil or setting station over which is placed the cloth or garment, so that when the plunger descends it forces the aligned button down on the prong of the tack, causing the prong to pierce the cloth and extend up into the bore of the button.

Finally, the shanks of the tack fasteners may be readily pointed, fluted and headed, after which the shanks may be forced into a barb forming tool, which has a plurality of plows set to plow the desired depth of barbs, so that the manufacture of the fasteners is relatively inexpensive.

Having thus described my invention, what I claim as new and desire to secure by Letters Patent is:

1. A metal fastener including a head, a pointed shank, a plurality of helical flutes defining ridges extending substantially throughout the length of the shank, the ridges of the flutes being provided with axially extending notches, barbs disposed adjacent the notches and the said barbs extending towards the head of the fastener to thereby add to the holding power of the fastener after being driven into an opening of slightly less diameter than the diameter of the shank of the fastener.

2. A metal fastener including a head, a pointed shank, and a plurality of helical flutes defining ridges extending along said shank, the ridges of the flutes being provided with axially extending plowed notches and the displaced metal adjacent the notches forming barbs and the points of the barbs extending towards the head of the fastener to thereby add to the holding power of the fastener after being driven into an opening of slightly less diameter than the diameter of the shank of the fastener.

3. A metal fastener including a head, a shank, a plurality of helical flutes defining ridges extending along said shank, the ridges of the flutes being provided with a series of plowed notches forming barbs, said barbs extending along lines substantially parallel with the central axis of the shank and disposed on the under surface of the ridges with the points of the barbs directed towards the head of the fastener to thereby add to the holding power of the fastener after being driven into an opening of slightly less diameter than the diameter of the shank of the fastener.

4. A metal fastener including a head, a pointed shank, a plurality of helical flutes defining ridges extending substantially throughout the length of the shank, the ridges of the flutes being provided with axially extending notches forming barbs, the said barbs extending towards the head of the fastener and on the under surface of their respective ridges, the said head of the fastener having a central dome shaped portion of less radius than the remainder of the head whereby the fastener may rotate freely when being driven into its receptive opening.

5. A metal fastener including a head, a pointed shank, a plurality of helical flutes defining ridges extending substantially throughout the length of the shank, the ridges of the flutes being provided with axially extending notches forming resultant barbs, the said barbs extending towards the head of the fastener and on the under surfaces of their respective flutes, the said head of the fastener consisting of a disk through which protrudes the rear end of the shank and the said rear end of the shank being headed in said disk to form a dome shaped portion centrally of the face of the disk whereby the fastener may rotate freely during an attaching operation.

FORREST G. PURINTON.